(12) United States Patent
Merritt, Jr.

(10) Patent No.: US 7,520,187 B2
(45) Date of Patent: Apr. 21, 2009

(54) BREAKAWAY/CRASH DETECTION SYSTEM FOR USE WITH A FIXTURE ON A COORDINATE MEASUREMENT MACHINE

(75) Inventor: Edward J. Merritt, Jr., Caledonia, NY (US)

(73) Assignee: Quality Vision International, Inc., Rochester, NY (US)

( * ) Notice: Subject to any disclaimer, the term of this patent is extended or adjusted under 35 U.S.C. 154(b) by 268 days.

(21) Appl. No.: 11/313,701

(22) Filed: Dec. 20, 2005

(65) Prior Publication Data

US 2007/0151323 A1 Jul. 5, 2007

(51) Int. Cl.
*G01B 5/00* (2006.01)
*G05B 15/00* (2006.01)

(52) U.S. Cl. .......................... 73/865.8; 33/503; 700/258
(58) Field of Classification Search .................... 33/503; 700/258, 259; 73/865.8
See application file for complete search history.

(56) References Cited

U.S. PATENT DOCUMENTS

| | | | | |
|---|---|---|---|---|
| 4,848,546 A | * | 7/1989 | McCormick et al. ..... | 192/56.32 |
| 5,210,399 A | * | 5/1993 | Maag et al. ................. | 250/202 |
| 5,496,999 A | * | 3/1996 | Linker et al. ................ | 250/306 |
| 5,672,816 A | * | 9/1997 | Park et al. ..................... | 73/105 |
| 5,782,445 A | * | 7/1998 | Cleek ...................... | 248/206.5 |
| 5,867,916 A | * | 2/1999 | Matzkovits .................. | 33/503 |
| 6,519,860 B1 | * | 2/2003 | Bieg et al. .................... | 33/503 |
| 6,852,002 B2 | * | 2/2005 | Stewart et al. ................ | 451/2 |

FOREIGN PATENT DOCUMENTS

DE 19622987 A1 * 12/1997

* cited by examiner

*Primary Examiner*—Harshad Patel
*Assistant Examiner*—Punam Patel
(74) *Attorney, Agent, or Firm*—Dominic P. Ciminello, Esq.; Stephen B. Salai, Esq.; Harter Secrest & Emery LLP

(57) ABSTRACT

A breakaway unit sits atop a base plate of a coordinate measuring machine via a breakaway coupling system. A crash detection system including at least one crash detection sensor mounted on the breakaway unit and a crash detection controller stops the machine when vertical movement of the breakaway unit exceeds a threshold. Should collision occur, the breakaway coupling system allows the breakaway unit to separate from the base plate, preventing damage to instruments mounted thereon. The kinematic coupling system preferably comprises tooling balls engaging respective vee cones, vee grooves, and/or flats.

45 Claims, 1 Drawing Sheet

BREAKAWAY/CRASH DETECTION SYSTEM FOR USE WITH A FIXTURE ON A COORDINATE MEASUREMENT MACHINE

BACKGROUND AND SUMMARY

Many multi-axis, multi-sensor coordinate measurement machines typically use crash-detection or crash-prevention mechanisms to avoid potential damage to probes and other sensing devices. Most of these mechanisms employ a release mount of the probe and/or sensors when a predetermined amount of force is applied to the probe and/or sensor. Because this force may include an impact element, the probe and/or sensors can be thrown out of alignment, requiring realignment and recalibration of the probe/sensors and the Z-axis at significant cost in time and funds. To reduce the amount of realignment and recalibration required after a collision, others have pursued various arrangements.

Consider, for example, U.S. Pat. No. 6,852,002 to Stewart et al., assigned to Flow International Corporation and entitled, "Apparatus and Methods for Z-Axis Control and Collision Detection and Recovery for Waterjet Cutting Systems." The cutting system includes a linear rail, a slide member coupleable to a cutting head and slidably coupled to the linear rail, an actuator having coupled to the slide member and fixed to the linear rail, a position sensor, and a controller. The actuator provides an adjustable support force that supports the weight of the cutting head, allowing the cutting head to be controllably positioned at a desired height above the workpiece. Stewart et al. use a first mount member coupleable to a controllably positionable mounting surface of the cutting system, a second mount member coupleable to the cutting head and disengageably coupled to the first mount member, and a sensing circuit having a plurality of first conductive elements disposed on the first mount member and a plurality of second conductive elements disposed on the second mount member. If the cutting head collides with an obstruction, the second mount member disengages from the first mount member to prevent breakage of the cutting head. After a collision, the second mount member is re-engaged with the first mount member without recalibration. Re-engagement of the second and first mount members can be performed automatically by a biasing member. While this is a step in the right direction, the arrangement can result in movement of the tool out of its aligned position. When the tool is reconnected, the degree to which it returns to its original alignment, and its repeatability, is not as high as a high precision metrological instrument requires.

Also consider U.S. Pat. No. 5,867,916 to Matzkovits, assigned to Carl-Zeiss-Stiftung and entitled, "Coordinate Measuring Machine with Collision Protection." This system is a coordinate measuring machine with a measuring arm on which a collision protector is provided. The collision protector can be deflected transversely of the longitudinal axis of the measuring arm when the measuring sensor system collides with an object. To operate the coordinate measuring machine with different measuring sensor systems and machining units, the coordinate measuring machine includes an identification unit that automatically identifies the measuring sensor system or machining unit. A securing unit is connected to the identification unit and allows adjustment of the torque required to deflect the collision protector in response to identification of the measuring sensor system or machining unit by the identification unit. While this prevents damage to the sensing unit, the collision protector is a breakaway portion of the measuring arm. When a collision induces movement of the collision protector, the arrangement does not guarantee precise realignment when the collision protector returns to its original position.

U.S. Pat. No. 5,210,399 to Maag et al., assigned to Carl-Zeiss-Stiftung, and entitled, "Optical Probe Head with Mounting Means Providing a Free Recalibration of the Sensing Head after a Collision," keeps all position-sensitive components rigidly fixed using a design similar to that of Stewart et al. An optical probe head has a front optic and an annular enclosure surrounding the front optic. The enclosure contains the illuminating device of the probe head. The front optic is rigidly attached to the optical probe head and the enclosure having the illuminating device and surrounding the front optic is attached to the optical probe head so as to be radially yieldable, such as with bearings related to the pin and ball arrangement of Stewart et al. In the case of a collision, only the enclosure having the illuminating optics is deflected, the imaging optics remaining undisturbed. In this way, Maag et al. state that a follow-up calibration of the probe head after a collision is no longer required.

DE19622987 to Mettendorf et al., assigned to Mycrona, and entitled, "Collision Protection Appliance for Sensors on Coordinate Measurement Machine." The appliance has a laminar clearance sensor (2) on the lower end of its measurement sensor (1). The sensor can be a capacitive device with its beam lobe directed both radially and axially. The beam lobe of the capacitive sensor can be directed radially and the axial protection against collision can be provided by a ring suspended from a mechanical switch.

Embodiments solve this dilemma of realignment and calibration of the vertical axis and the primary measurement sensor, as well as secondary and tertiary measurement sensors, if present, by removing all collision-related release from the instrument tower. A mounting plate to which a fixturing device, such as a rotary module, can be attached rests on a base plate via a kinematic mount arrangement. The kinematic mount of embodiments allows the mounting plate to break away from the base plate in the event of a collision, yet provides enough resistance that ordinary operative fluctuations in moment and orientation of the mounting plate resulting from motion of the fixturing device do not initiate breakaway. Additionally, the kinematic mount allows the mounting plate to be replaced in the kinematic mount to within microns of its original position after a collision, eliminating the need for recalibration of the instrumentation. If, however, calibration is required, a simple, quick calibration can be performed using a removable artifact.

Additionally, embodiments employ a crash detection system, preferably mounted on the mounting plate. The crash detection system of embodiments uses sensors, such as proximity sensors, and a controller to monitor the state of the mounting plate and, when the mounting plate breaks away from the base plate, stops the machine in which the breakaway/crash detection system is used. By making the breakaway/crash detection system part of the portion of the device that holds an object to be inspected, the sensors are isolated from shift due to a collision and thus do not need to be recalibrated after a collision/breakaway. Instead, the plate can simply be replaced on the base plate with no calibration, and the inspection can be restarted or resumed. If calibration is required, a very quick procedure can be employed involving a reference artifact placed on the plate. Thus, embodiments eliminate the need for realignment and calibration of sensors after a collision.

The rotary module, or other fixturing devices, to which the breakaway/crash detection system is fixed, breaks away from the solid horizontal axis of motion in embodiments upon collision. The break away design allows the optical system, probes, sensors, and any other position-sensitive components to be rigidly mounted to the vertical axis of the machine and minimizes or eliminates the release and re-align problem. This preserves the accuracy and repeatability of the optics, sensors, probes, and axis of motion in the event of a collision. Additionally, by placing the breakaway design low on the horizontal axis, the possibility of any small errors accumulating during re-alignment is reduced, particularly in accordance with vertical axis. Such small errors are amplified as the focal or working distance of the sensors is increased. The break away design of embodiments thus overcomes the alignment and calibration issues present in the prior art.

DESCRIPTION

Figure 1:
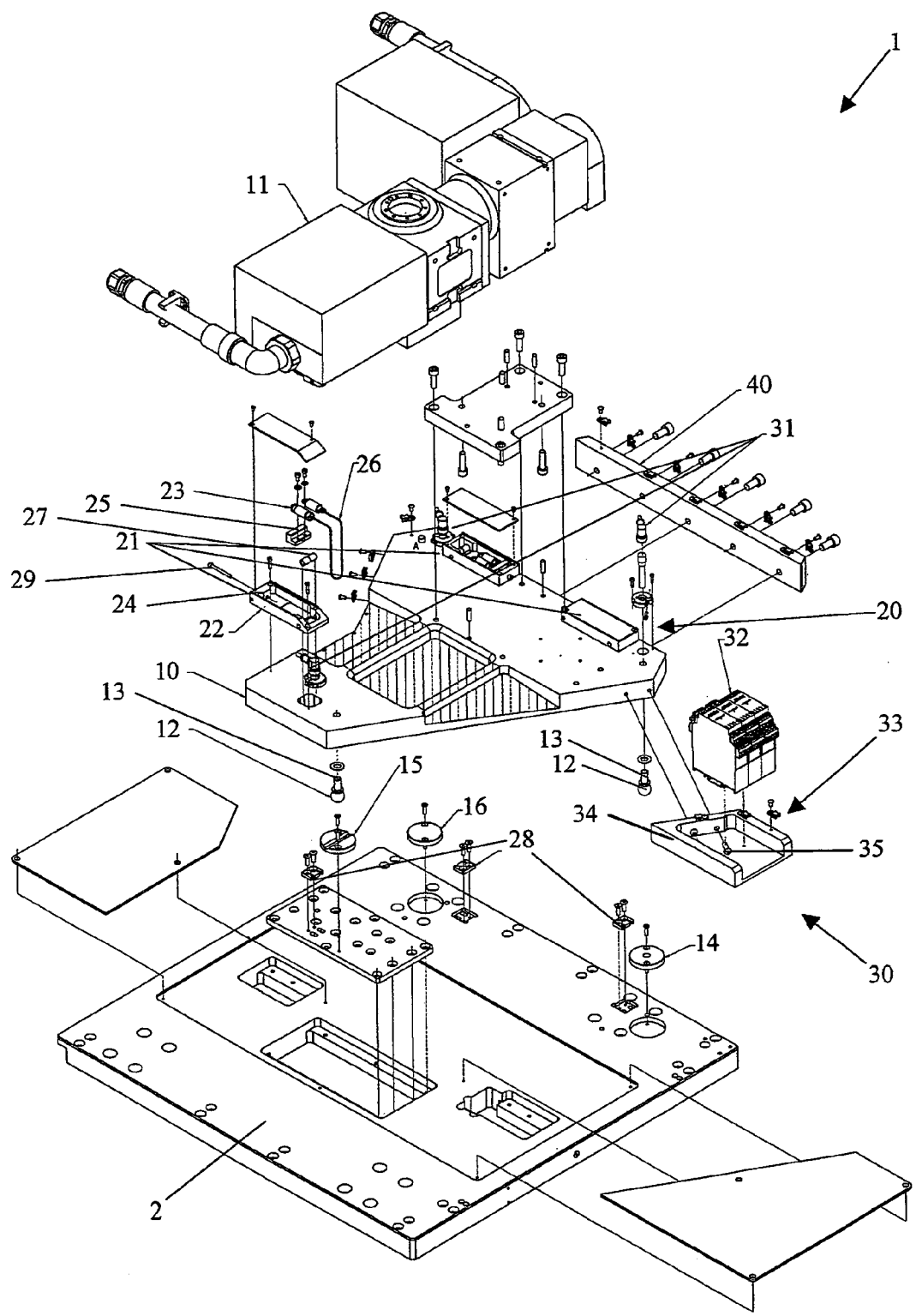
FIG. 1 is an exploded schematic view of a breakaway system with crash detection on a stage of a precision measurement apparatus according to embodiments.

This description sets forth an exemplary embodiment with reference to the accompanying Figures. This exemplary embodiment is not limiting, and variations are encompassed by embodiments.

As mentioned above, embodiments reduce or eliminate the need to realign and recalibrate the vertical axis and primary and, when present, additional measurement sensors. As seen, for example, in FIG. 1, embodiments of a breakaway and crash detection system 1 can include a stage 2 that supports a mounting or fixturing plate 10 on which a fixturing device 11, such as a rotary module, can be arranged to hold and/or manipulate an object to be inspected. While the fixturing device 11 used with embodiments is shown in the FIG. as a rotary module, embodiments can be used with other such fixturing devices as appropriate.

The breakaway system includes a kinematic mounting arrangement, preferably including three tooling balls 12. As is known in the art, tooling balls are high-precision hardened steel balls. In embodiments, the tooling balls 12 are attached to one of the mounting or fixturing plate 10 and the stage 2. As seen in FIG. 1, the tooling balls 12 are preferably mounted in the fixturing plate via posts that can include, for example, threads. The tooling balls 12 rest in features 14, 15, 16 mounted or formed on the stage 2 to form the kinematic mount, which supports the fixturing plate 10 via the tooling balls 12. Since the stage 2 of embodiments can be made from materials not suitable for repeatable repositioning of the fixturing plate 10, embodiments provide hardened pads in which the respective features 14, 15, 16 receiving the balls 12 are formed. The pads can be made from hardened, ground steel, for example, or any other suitable material.

At least two of the pads preferably include features that engage their respective tooling balls 12 and prevent motion of the firing plate in at least one direction to constrain the fixturing plate 10 against translation in the plane of the stage 2. For example, embodiments employ a vee cone 14 that prevents motion of one tooling ball 12 in the plane of the stage 2, a vee groove 15 that prevents motion of its tooling ball 12 along a specific axis in the plane of the stage 2, and a flat 16 that prevents rotation of the fixturing plate 10 about the axis defined by the other two tooling balls 12. However, the arrangement allows, and induces, vertical motion of the plate 10—motion perpendicular to the plane of the stage 2—should the plate 10 collide with something or should something else collide with the plate.

Thus, in embodiments, the three tooling balls 12 preferably engage with a vee cone 14, a vee groove 15, and a flat 16, respectively. The tooling balls 12 and vee cones 14, vee grooves 15, and flats 16 are typically made from hardened, ground steel to preserve their dimensional accuracy and geometry. Such a system firmly holds the first, fixturing plate 10 to the second plate or stage 2 in a particular alignment even after repeated reseating of the balls 12 in their respective features 14, 15, 16, which is how the alignment of embodiments is preserved.

To prevent unintentional vertical translation of the plate 10 beyond what gravity provides, a biasing or preload arrangement 20 can be included. In embodiments, the biasing arrangement 20 includes a plurality of adjustable preload devices 21, preferably mounted near the tooling balls 12. An example of a preload device 21 suited for use with embodiments includes a housing 22 that supports one or more springs 23, the springs 23 being connected to a wall 24 of the housing at one respective end and a pull bar 25 at the other respective end. The pull bar 25 in turn retains an end of a cable 26 that extends over a bushing 27 and down through the housing 22, through the fixturing plate 10, and toward the stage 2 to which it is connected. Embodiments employ a loop of cable 26 that has left and right legs, the ends attached to the springs 23, and the extremity of the loop being hooked about an attachment point 28 in the stage 2. A screw 29 extending through the preload device housing 22 and into the pull bar 25 allows adjustment of a preload induced by the device.

As seen in FIG. 1, embodiments can include three substantially equally spaced such adjustable preload devices 21 on the first, fixturing plate 10. Once installed and adjusted, the preload devices 21 bias the fixturing plate 10 and stage 2 together so that more force is required to induce vertical motion of the fixturing plate 10 that would result in breakaway of the fixturing plate 10 from the stage 2. This prevents unintentional breakaway should a sudden motion or high-mass rotation of the fixturing device 11 cause the fixturing plate 10 to jump. A larger mass or higher center of gravity may require a higher preload and a smaller mass or lower center of gravity a lower preload. When used with a rotary module as the fixturing device 11, for example, the mass of the module moves through an arc and may require a higher fixturing preload than other types of fixturing devices. The adjustable preload devices 21 provide the ability to accommodate these requirements and can also aid in returning the unit to its original mounting should breakaway occur.

As seen in the accompanying FIG 1 the breakaway system of embodiments is preferably placed low on the horizontal axis of the machine to reduce the accumulation of small errors accruing during re-alignment, particularly with respect to the vertical axis. Such small errors are generally amplified as the focal distance or working distance of the sensor is increased. In operation, the fixturing plate 10 breaks away from the solid horizontal axis of motion in embodiments when a collision occurs. The breakaway arrangement of embodiments substantially eliminates the release and re-align problem of prior art devices with respect to the optical system, probes, sensors, and any other position-sensitive components rigidly mounted to the vertical axis. This preserves the accuracy and repeatability of the optics, sensors, probes and axis of motion.

Embodiments preferably further include a crash detection system 30 that comprises at least one proximity sensor 31 capable of sensing small variations in vertical movement, preferably as little as 0.0005" (12 μm). The at least one sensor 31 is connected to a proximity controller 32 that stops motion in the horizontal direction in a small amount of travel, preferably as little as 0.002" of travel, if the sensor 31 senses movement of the fixturing plate 10. In particular, embodiments preferably include three displacement sensors very near or adjacent the tooling balls 12 on the fixturing plate 10 and connected to the proximity controller 32, as seen in FIG. 1. Embodiments contemplate the use of various types of position/displacement sensors. For example, proximity, reed, laser, capacitance, and/or force sensors can all be applied. In addition, any other type of position/displacement sensor could be employed as long as it meets the requirements of the system 30. The proximity controller(s) 32 can be mounted on a support 33 attached to the fixturing plate 10, though a remote controller 32 could also be employed. As shown, the controller mount 33 includes a plate 34 attached to the fixturing plate 10 with screws 35 or the like, but the mount 33 could instead be formed as part of the fixturing plate 10.

In embodiments, the breakaway/crash detection unit can include a mechanical stiffener 40, such as the rail shown in FIG. 1, to prevent axial twist of the breakaway unit during operation of the fixturing device 11, such as during rotation of a primary rotary under maximum loading conditions. The fixturing plate 10 is preferably kept to a minimum thickness to prevent loss of vertical measurement capability in such an arrangement. Including the stiffener 40 affords a high measurement volume to stiffness ratio, which reduces errors that can accumulate in the five axes of motion of the unit. The high ratio also reduces the effect of compounding errors in the final measurement results.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. In a measurement machine having at least one sensor, a breakaway apparatus for holding an object to be measured and having a component adapted to be reliably returned to a known position after breaking away, the breakaway apparatus comprising:
    a stage configured to translate the object relative to the sensor;
    a fixturing plate releasably attached to the stage and configured to hold the object to be measured;
    a plurality of releasable mounts arranged between the fixturing plate and the stage to support the fixturing plate on the stage and to constrain motion of the fixturing plate relative to the stage in a plane substantially parallel to the fixturing plate and the stage, yet allowing breakaway motion of the fixturing plate in a direction substantially perpendicular to the stage; and
    a crash detection arrangement comprising at least one proximity sensor mounted on one of the plate and the stage, the at least one proximity sensor being connected to a proximity controller that stops operation of the measuring device when the distance between the sensor and the stage exceeds a predetermined distance.

2. The apparatus of claim 1 wherein each mount comprises a tooling ball.

3. The apparatus of claim 2 wherein each mount rests on a feature provided on the stage.

4. The apparatus of claim 3 wherein each feature is part of a hardened pad of the stage.

5. The apparatus of claim 4 wherein each hardened pad is formed of hardened, machined steel and is mounted in the stage to be substantially flush with a surface of the stage.

6. The apparatus of claim 3 wherein at least one feature is a flat constraining its respective tooling ball against rotation about an axis substantially parallel to a surface of the stage.

7. The apparatus of claim 1 wherein each mount is attached to the fixturing plate.

8. The apparatus of claim 1 wherein each mount is attached to the stage.

9. The apparatus of claim 1 further comprising an adjustable preloading arrangement that biases the fixturing plate toward the stage.

10. The apparatus of claim 1, further including a fixturing device connected to the fixturing plate, the fixturing device configured to controllably move the object between known positions during measurement by the at least one sensor.

11. The apparatus of claim 10, wherein the at least one sensor is not supported by the fixturing plate.

12. The apparatus of claim 10, wherein the fixturing device comprises a rotary module.

13. The apparatus of claim 1, further including a stiffener connected to the fixturing plate.

14. The apparatus of claim 13, wherein the stiffener substantially prevents axial twist of the breakaway apparatus.

15. In a measurement machine having at least one sensor, a breakaway apparatus for holding an object to be measured and having a component adapted to be reliably returned to a known position after breaking away, the breakaway apparatus comprising:
    a stage configured to translate the object relative to the sensor;
    a fixturing plate releasably attached to the stage and configured to hold the object to be measured; and
    a plurality of releasable mounts arranged between the fixturing plate and the stage, to support the fixturing plate on the stage and to constrain motion of the fixturing plate relative to the stage in a plane substantially parallel to the fixturing plate and the stage, yet allowing breakaway motion of the fixturing plate in a direction substantially perpendicular to the stage,
    each of the plurality of mounts comprising a tooling ball and resting on a feature provided on the stage, wherein at least one feature is a vee cone constraining motion of its respective tooling ball in a plane substantially parallel to a surface of the stage.

16. The apparatus of claim 15, further including a fixturing device connected to the fixturing plate, the fixturing device configured to controllably move the object between known positions during measurement by the at least one sensor.

17. The apparatus of claim 16, wherein the fixturing device comprises a rotary module.

18. In a measurement machine having at least one sensor, a breakaway apparatus for holding an object to be measured and having a component adapted to be reliably returned to a known position after breaking away, the breakaway apparatus comprising:
    a stage configured to translate the object relative to the sensor;
    a fixturing plate releasably attached to the stage and configured to hold the object to be measured; and
    a plurality of releasable mounts arranged between the fixturing plate and the stage, to support the fixturing plate on the stage and to constrain motion of the fixturing plate relative to the stage in a plane substantially parallel to the fixturing plate and the stage, yet allowing breakaway motion of the fixturing plate in a direction substantially perpendicular to the stage,
    each of the plurality of mounts comprising a tooling ball and resting on a feature provided on the stage, wherein at least one feature is a vee groove constraining motion of its respective tooling ball to translation along a line substantially parallel to a surface of the stage.

19. The apparatus of claim 18, further including a fixturing device connected to the fixturing plate, the fixturing device configured to controllably move the object between known positions during measurement by the at least one sensor.

20. The apparatus of claim 19, wherein the fixturing device comprises a rotary module.

21. In a measurement machine having at least one sensor, a breakaway apparatus for holding an object to be measured and having a component adapted to be reliably returned to a known position after breaking away, the breakaway apparatus comprising:
 a stage configured to translate the object relative to the sensor;
 a fixturing plate releasably attached to the stage and configured to hold the object to be measured; and
 a plurality of releasable mounts arranged between the fixturing plate and the stage, to support the fixturing plate on the stage and to constrain motion of the fixturing plate relative to the stage in a plane substantially parallel to the fixturing plate and the stage, yet allowing breakaway motion of the fixturing plate in a direction substantially perpendicular to the stage, wherein each mount comprises a bolt secured to the fixturing plate and a tooling ball at an end of the bolt between the fixturing plate and the stage.

22. The apparatus of claim 21, further including a fixturing device connected to the fixturing plate, the fixturing device configured to controllably move the object between known positions during measurement by the at least one sensor.

23. The apparatus of claim 22, wherein the fixturing device comprises a rotary module.

24. In a measurement machine having at least one sensor, a breakaway apparatus for holding an object to be measured and having a component adapted to be reliably returned to a known position after breaking away, the breakaway apparatus comprising:
 a stage configured to translate the object relative to the sensor;
 a fixturing plate releasably attached to the stage and configured to hold the object to be measured;
 a plurality of releasable mounts arranged between the fixturing plate and the stage, to support the fixturing plate on the stage and to constrain motion of the fixturing plate relative to the stage in a plane substantially parallel to the fixturing plate and the stage, yet allowing breakaway motion of the fixturing plate in a direction substantially perpendicular to the stage; and
 an adjustable preloading arrangement that biases the fixturing plate toward the stage, the preloading arrangement comprising
 at least one adjustable biasing device including a spring connected to the fixturing plate, an adjustment device, and the stage, the adjustment device allowing change in force biasing the plate and stage together.

25. The apparatus of claim 24 wherein the at least one adjustable biasing device comprises a housing mounted on one of the fixturing plate and the stage, the adjustment device comprising a screw extending through a wall of the housing and connected at an interior end to a bar, one end of the spring being connected to the bar and another end of the spring being connected to a cable attached to the other of the fixturing plate and the stage, the spring pulling on the cable and the housing, thereby biasing the fixturing plate and the stage together.

26. The apparatus of claim 25 wherein the housing is mounted on the fixturing plate and the cable is connected to the stage.

27. The apparatus of claim 26 wherein the at least one adjustable biasing device comprises two springs, one end of each spring being attached to a bar into which the screw extends and another end of each spring being connected to an end of the cable, the cable being looped about an attachment point of the stage.

28. The apparatus of claim 24, further including a fixturing device connected to the fixturing plate, the fixturing device configured to controllably move the object between known positions during measurement by the at least one sensor.

29. The apparatus of claim 28, wherein the fixturing device comprises a rotary module.

30. In a measurement machine having at least one sensor, a breakaway apparatus for holding an object to be measured and having a component adapted to be reliably returned to a known position after breaking away, the breakaway apparatus comprising:
 a stage configured to translate the object relative to the sensor;
 a fixturing plate releasably attached to the stage and configured to hold the object to be measured;
 a plurality of releasable mounts arranged between the fixturing plate and the stage to support the fixturing plate on the stage and to constrain motion of the fixturing plate relative to the stage in a plane substantially parallel to the fixturing plate and the stage, yet allowing breakaway motion of the fixturing plate in a direction substantially perpendicular to the stage; and
 three proximity sensors, each deployed near a respective mount.

31. The apparatus of claim 30, further including a fixturing device connected to the fixturing plate, the fixturing device configured to controllably move the object between known positions during measurement by the at least one sensor.

32. The apparatus of claim 31, wherein the fixturing device comprises a rotary module.

33. A crash detection and breakaway apparatus comprising:
 a fixturing plate on which a fixturing device can be mounted;
 a stage supporting the fixturing plate, the fixturing plate releasably attached to the stage and configured to hold an object to be measured;
 a kinematic mount arrangement between the fixturing plate and the stage by which the stage supports the fixturing plate;
 the kinematic mount arrangement constraining the fixturing plate against motion in a plane of the fixturing plate and against rotation about an axis parallel to the plane of the fixturing plate while allowing vertical breakaway movement of the fixturing plate away from the stage;
 at least one proximity sensor mounted in one of the fixturing plate and the stage;
 a proximity controller to which the at least one proximity sensor is connected, the proximity controller also being connected to a measuring device in which the crash detection and breakaway apparatus is used;
 the at least one proximity sensor being arranged to send a signal to a controller when a gap between the fixturing plate and stage exceeds a predetermined distance, thereby triggering the controller to stop operation of the measuring device.

34. The apparatus of claim 33 wherein the kinematic mount arrangement comprises at least three tooling balls mounted in one of the fixturing plate and the stage and engaging respective features on the other of the fixturing plate and the stage.

35. The apparatus of claim 34 wherein the respective features include a vee groove, a vee cone, and a flat.

36. The apparatus of claim 34 wherein the respective features are formed in hardened steel pads.

37. The apparatus of claim 34 wherein the tooling balls are mounted on the fixturing plate and the respective features are on the stage.

38. The apparatus of claim 33 further comprising an adjustable preload apparatus biasing the fixturing plate and stage toward each other, thereby increasing a force required to dislodge the fixturing plate from the kinematic mount.

39. The apparatus of claim 38 wherein the adjustable preload apparatus comprises at least one spring device mounted on one of the fixturing plate and the stage and a cable attached to the other of the fixturing plate and the stage.

40. The apparatus of claim 39 wherein the at least one spring device comprises a housing in which at least two springs reside, one end of each spring being mounted on a cross bar and another end of each spring being attached to an end of a loop of cable, an adjustment screw extending through a wall of the housing and into the cross bar to allow adjustment of the preload, the loop of cable extending from the housing to loop about an attachment point on the other of the fixturing plate and the stage.

41. The apparatus of claim 33, further including a fixturing device connected to the fixturing plate, the fixturing device configured to controllably move the object between known positions during measurement by the at least one sensor.

42. The apparatus of claim 41, wherein the at least one sensor is not supported by the fixturing plate.

43. The apparatus of claim 41, wherein the fixturing device comprises a rotary module.

44. The apparatus of claim 33, further including a stiffener connected to the fixturing plate.

45. The apparatus of claim 44, wherein the stiffener substantially prevents axial twist of the breakaway apparatus.

* * * * *